Patented Apr. 17, 1945

2,373,945

UNITED STATES PATENT OFFICE 2,373,945

PLASTIC COMPOSITION FOR PRODUCTION OF WALLBOARDS AND PROCESS OF MAKING THE SAME

George M. Bruns, O'Quinn, Tex.

No Drawing. Application September 10, 1942, Serial No. 457,882

2 Claims. (Cl. 260—9)

The invention relates to improvements in plastic composition for the production of wallboard and to processes of making the same, and to the articles obtained by molding or extruding the composition, and the primary object of the invention is to provide a plastic composition of this character which is devoid of acid or alkali material, can be mixed by the use of cold water, and can if desired be molded without the use of heat or pressure.

Other important objects and advantages of the invention will be apparent from a reading of the following description and the examples therein set forth for illustrative purposes.

The present plastic composition contemplates a combination of (1) a urea-formaldehyde resin (such as "Cascamite"); (2) an element selected from a group consisting of fuller's earth, flake mica and feldspar; (3) crude cotton fibre (unprocessed fibre as obtained in the process of ginning cotton); (4) water.

Suitable embodiment of the invention can be formed from the following ranges of proportions of the ingredients:

Urea-formaldehyde resin from 8 to 24 ounces.
An element selected from a group consisting of fuller's earth, flake mica and feldspar from 10 to 18 ounces.
Fiber from 1 to 8 ounces.
Water sufficient for producing a plastic mixture.

The preferred composition of the invention, products produced from which are incombustible, heat resistant, a non-conductor of electricity, remain undistorted when immersed in water or subjected to moisture, light in weight and strong, consists of substantially

| | | |
|---|---|---|
| Urea-formaldehyde resin | pounds | 1 |
| An element selected from a group consisting of fuller's earth, flake mica and feldspar | ounces | 18 |
| Fiber | do | 3 |

Sufficient water for mixing and degree of plasticity desired.

*Preparation*

In compounding the ingredients sufficient water, usually about two parts by volume of cold water to one part of resin, is mixed with the urea-formaldehyde resin and mixed until a heavy paste is obtained.

The fiber is added to the resultant and distributed evenly by thorough mixing.

The element selected from a group consisting of fuller's earth, flake mica and feldspar is added to the resultant and distributed evenly therein by thorough mixing.

The composition thus obtained is then ready to be poured into a form or mold and the finished plastic article can then be produced in any of four ways:

(1) By letting the contents of the form or mold dry and harden by itself.
(2) By applying heat thereto.
(3) By applying pressure thereto.
(4) By applying heat and pressure thereto.

It will be obvious that between the limits of variation set forth herein the proportions of the ingredients and the method of molding will be varied in accordance with the product desired and the conditions of manufacture prevailing.

Having described the invention, what is claimed as new is:

1. A process of making a moldable plastic composition devoid of acid and alkali material for wallboards, consisting in adding sufficient water to form a paste with from 8 to 24 ounces of urea-formaldehyde resin, then mixing therewith from 10 to 18 ounces of an element selected from a group consisting of fuller's earth, flake mica, and feldspar; and from 1 to 8 ounces of untreated cotton fiber.

2. A moldable wallboard composition, devoid of acid and alkali and which is heat resistant, incombustible and a non-conductor of electricity, said composition consisting in a homogeneous mixture of from 8 to 24 ounces of urea-formaldehyde, 10 to 18 ounces of an element selected from a group consisting of fuller's earth, flake mica and feldspar, one to eight ounces of crude cotton fiber and sufficient water.

GEORGE M. BRUNS.